July 25, 1967
P. A. WILKS, JR. 3,332,315
FRUSTRATED MULTIPLE INTERNAL REFLECTION SPECTROMETRIC SYSTEM
Filed Dec. 31, 1963
3 Sheets-Sheet 1
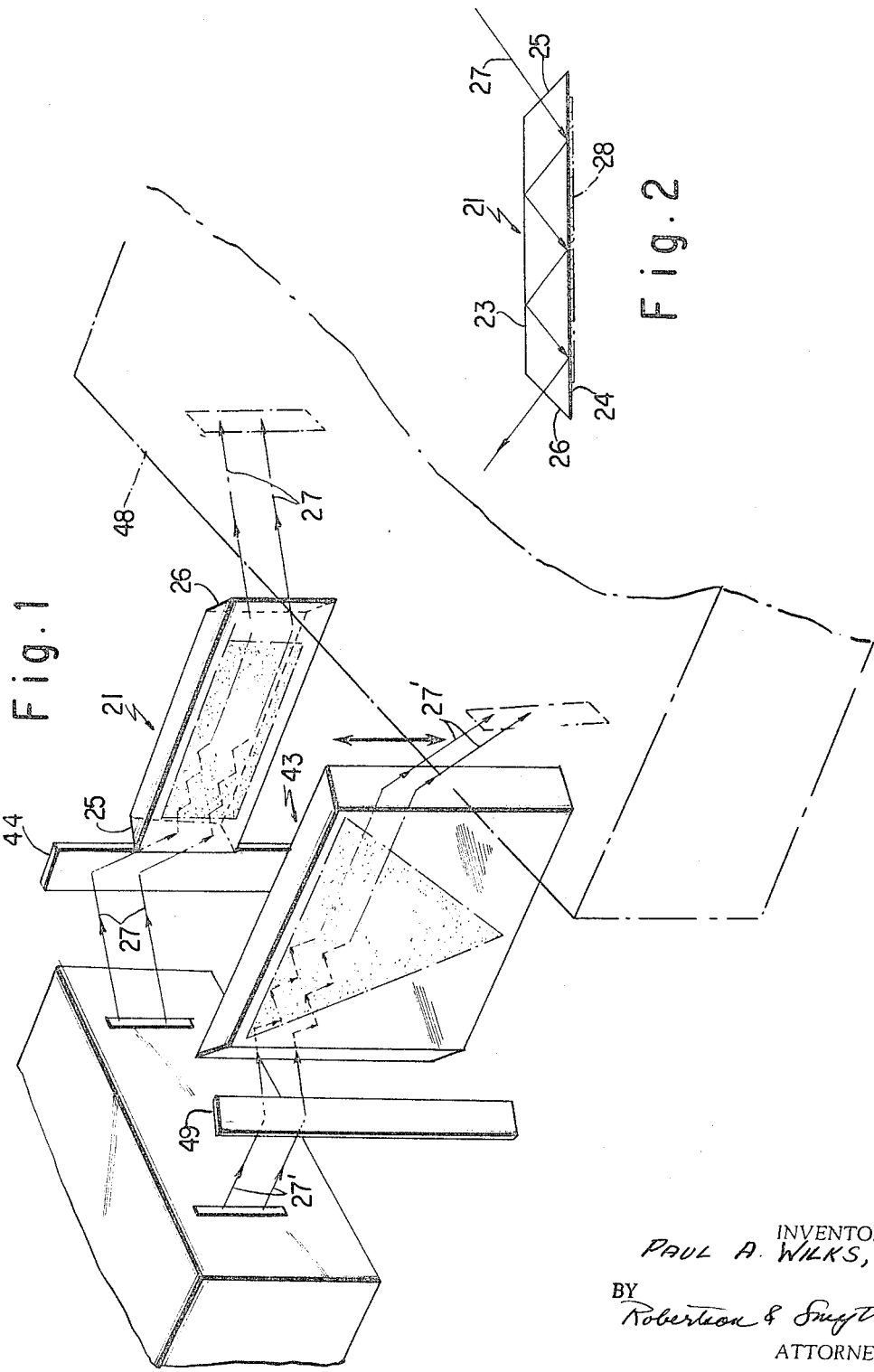
INVENTOR.
PAUL A. WILKS, JR.
BY Robertson & Smythe
ATTORNEYS

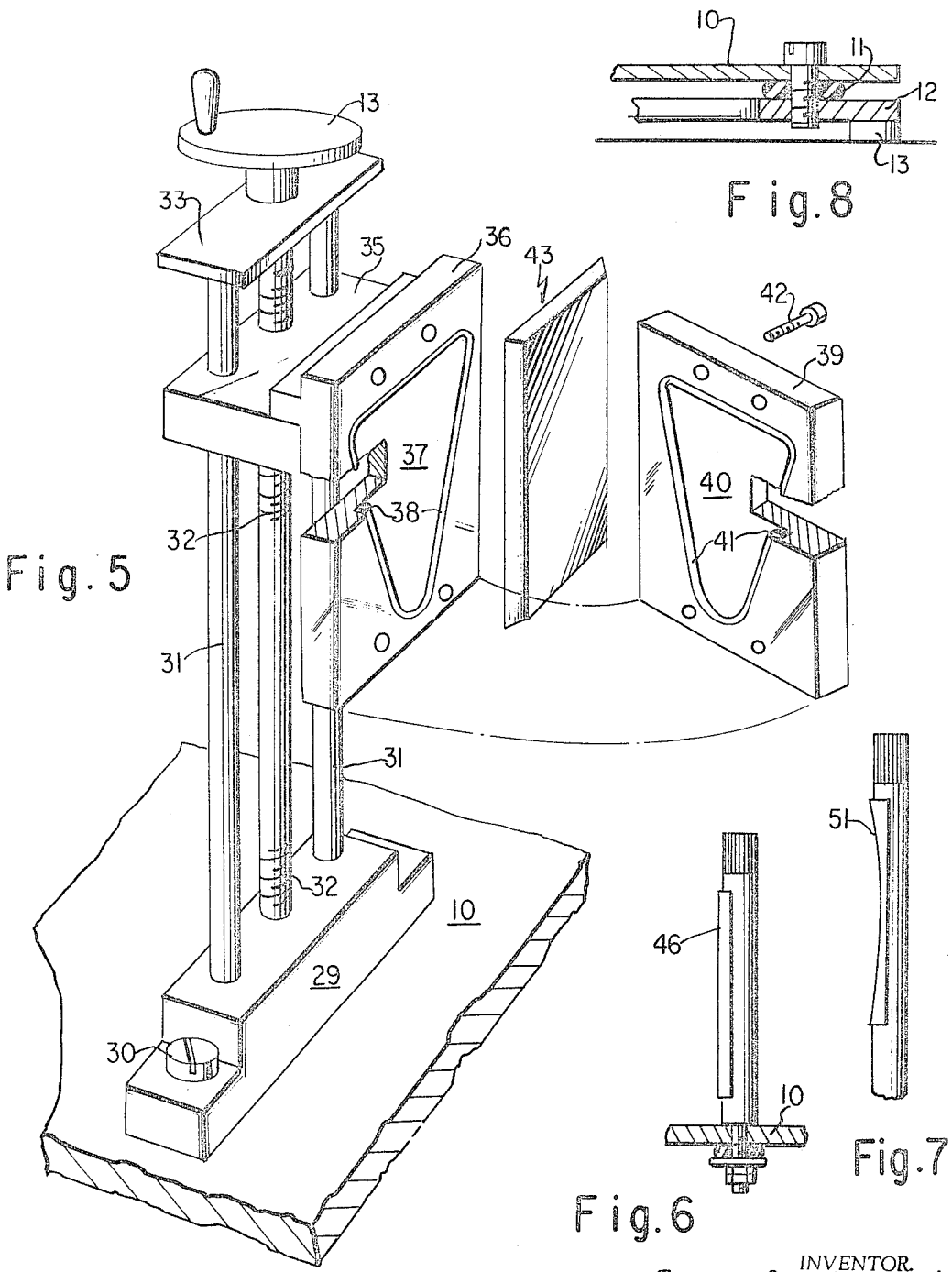

United States Patent Office 3,332,315
Patented July 25, 1967

3,332,315
FRUSTRATED MULTIPLE INTERNAL REFLECTION SPECTROMETRIC SYSTEM
Paul A. Wilks, Jr., Darien, Conn., assignor to Wilks Scientific Corporation, Norwalk, Conn., a corporation of Connecticut
Filed Dec. 31, 1963, Ser. No. 334,764
6 Claims. (Cl. 88—14)

ABSTRACT OF THE DISCLOSURE

Frustrated multiple internal reflection system utilizing two cells each composed of a crystal in contact with different substances. Light is internally reflected through each cell and the spectral output of the first cell containing one component, is nullified with the spectral output of the second cell, composed of said component plus another, resulting in an output indicative of the difference in composition of the two cells.

---

This invention relates to spectroscopy and particularly to a variable area absorption cell for obtaining differential absorption spectra by "frustrated multiple internal reflection."

"Frustrated multiple internal reflection" (FMIR) is a system in which relatively strong liquid and solid phase infrared spectra can be produced on a minimum of molecules of the sample under consideration. Briefly, it is produced by directing a radiant beam onto the edge of a plate made from a radiant energy transmitting material such as sodium chloride, thallium bromide iodide or sapphire. The plate may include parallel top and bottom surfaces, and a radiant beam must strike the edge of the plate at an angle greater than the critical angle, and strike the internal side walls of the plate at an angle less than the critical angle. Thus, the radiant energy rays directed onto one edge of the plate at substantially right angles thereto will be internally reflected along the longitudinal axis of the plate a plurality or a multiple number of times. The edge of the plate opposite that against which the radiant beam is directed is also nearly normal to the beam (greater than the critical angle) and the beam passes out of the plate.

If a sample material is brought into contact with the sides of the FMIR plate, the internal reflection will be reduced or "frustrated" at those wavelengths where the material absorbs. This absorption takes place with each reflection. Consequently, the number of reflections and hence the area of the plate determine the amount of absorption. Inasmuch as the beam penetrates a few microns into the sample and then returns to the plate, the thickness of the sample material beyond that penetration depth is of no significance. Accordingly, the amount of absorption by a given sample in contact with an internally reflecting radiant energy beam is a function of the area of contact between the sample material and the plate.

The above is in contrast to prior known spectroscopy where the beam of radiant energy passes through the sample material and absorption is proportional to the thickness of the sample material. In such prior known systems, two beams are balanced or nulled by placing a fixed pathlength cell in one beam and a variable pathlength cell in the other.

The principal object of the present invention is to provide a system of spectroscopy in which a relatively strong liquid phase infrared spectrum can be produced on a minimum of molecules of a sample material.

Another object of the invention is to provide such a system in which a multicomponent sample can be analyzed by nulling the spectrum of certain of the components.

Still another object of the invention is to produce such a system in which a variable area absorption cell is combined with a sample cell to produce a differential absorption spectrum by frustrated multiple internal reflection.

In one aspect of the invention, a sample of material having, for example, two components, one of which is known, may be contained within a stationary sample cell such that it contacts preferably both sides of a vertically disposed plate crystal of a radiant energy transmitting material such as sodium chloride, thallium bromide iodide or sapphire. The plate includes parallel faces of substantial area and opposed edges beveled in a manner to receive and transmit a beam of radiant energy at an angle greater than the critical angle.

In another aspect of the invention, the known component may be contained within a vertically arranged reference cell that has a greater vertical dimension than the sample cell. It may include a pocket for receiving the component and for maintaining it in contact with both faces of another identical crystal, but covering an area thereon in which the upper horizontal length of contact is much greater than the horizontal length of contact at the bottom of such area.

In still another aspect of the invention, beams of radiant energy such as infrared rays may be focussed on corresponding edges of the two plate crystals such that they are substantially normal to the plane of said edges and such that the beams reflect back and forth from the internal surfaces of the faces of the plate crystals at angles less than the critical angle, pass out from the opposed entering edge and are directed by a lens system into a spectrophotometer.

In still another aspect of the invention, the reference cell may be mounted for vertical movement relative to the stationary sample cell, so that the beam of radiant energy passing through the reference crystal will act on varying areas of the component.

Since the effective area of contact of each component in a multicomponent sample is proportional to the concentration of the component, vertical movement of the reference cell, having the varying area contact, can be used to provide an area of contact of the reference component equal to the effective area of contact of that component in the sample cell. This results in nulling the spectrum of the compared component within the spectrophotometer, thus enabling an analysis of the other component.

In still another aspect of the invention, a solid material may be held in contact with one or both sides of the sample plate crystal, in which case a triangular shaped piece of solid may be held against one or both faces of the reference crystal.

The above, other objects and novel features of the invention will become apparent from the following description and accompanying drawings which are merely exemplary.

In the drawings:

FIG. 1 is a schematic perspective view of a combination of elements to which the principles of the invention have been applied;

FIG. 2 is a view of a plate crystal forming an element of the combination of FIG. 1;

FIG. 5 is an exploded, partial sectional view of the reference cell of FIG. 3;

FIG. 6 is a sectional view taken substantially along line 6—6 of FIG. 3;

FIG. 7 is a sectional view taken substantially along line 7—7 of FIG. 3; and

FIG. 8 is a sectional view taken substantially along line 8—8 of FIG. 3.

Figure 3:
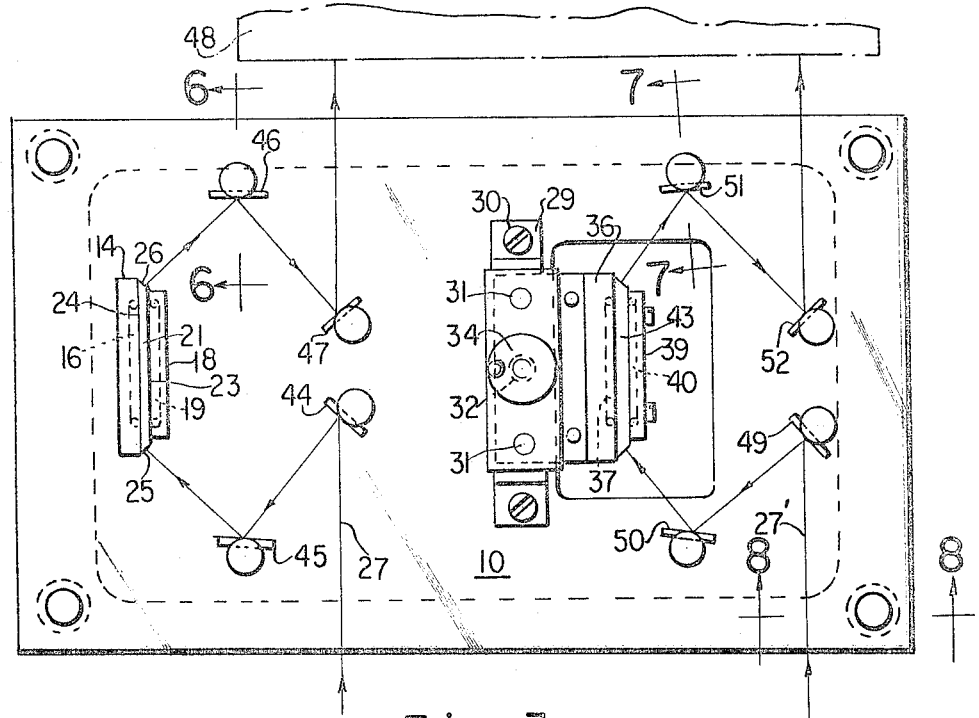
FIG. 3 is a top plan view of the elements of FIG. 1 arranged in a physical embodiment of the invention.
Figure 4:
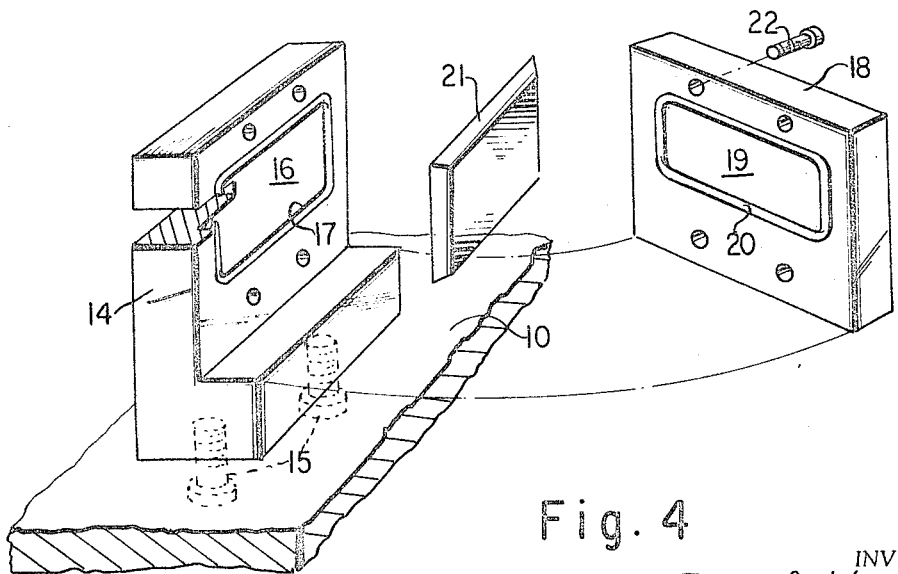
FIG. 4 is an exploded, partial sectional view of the sample cell of FIG. 3.

Referring to the drawings, and particularly to FIGS. 3, 4 and 5, the principles of the invention are shown as applied to a system including a base 10 that is supported on resilient means such as O-rings (FIG. 8) mounted on a platform 12 having feet 13 for supporting the assembly on a table.

Referring to FIG. 4, the base 10 may have an L-shaped bracket 14 fixed to it by screws 15, and it may include a pocket 16 shown in the present embodiment as being rectangular in shape. The pocket 16 may be surrounded by a sealing ring such as an O-ring 17.

A member 18 may be provided with a pocket 19 and seal 20 that matches the pocket 16, and a plate crystal 21 may be located between pockets 16 and 19 with the seals 17 and 20 firmly contacting opposed faces of the crystal 21 by screws 22. The construction is such that a multicomponent sample may be confined within pockets 16 and 19 in contact with the opposed faces of the crystal 21.

Crystal 21 may be made from a radiant energy transmitting material such as sodium chloride, thallium bromide iodide or sapphire. Referring to FIG. 2, crystal 21 may include parallel surfaces 23, 24 and beveled end edges 25, 26. The construction is such that a beam 27 directed at an angle greater than the critical angle and substantially normal to the edge surface 25 passes into the crystal and makes an angle less than the critical angle with the surface 24, reflecting off it onto surface 23 at an angle less than the critical angle. The beam 27 reflects off the surfaces 24 and 23, passing throughout the length of the crystal 21 until it passes through surface 26 at an angle greater than the critical angle.

If a material 28 lies in contact with face 24, the internal reflection just described will be reduced, or "frustrated," at those wavelengths where the material 28 absorbs. This absorption takes place at each reflection and is effected by the beam penetrating a few microns into the material 28 after which it returns to the interior of the crystal 21. Accordingly, the thickness of the sample beyond that penetration depth is of no significance. Thus, the amount of absorption of wavelengths of the internally reflecting beam 27 by a given sample in contact with the crystal 21 is a function of the area of contact between the crystal 21 and the material 28, and is independent of the thickness of such material.

Referring to FIG. 5, the base 10 may also have a support 29 rigidly fixed to it by screws 30. Support 29 may include parallel, vertically extending guide rods 31 between which may be a vertically extending, parallel rotatable screw 32. A top plate 33 may connect rods 31, and screw 32 may extend through plate 33 and support a handwheel 34 at its upper end.

A bracket 35 may have holes therethrough for slidingly receiving rods 31, and a threaded hole for threadingly receiving screw 32. The construction is such that rotation of handwheel 34 in both directions will raise and lower bracket 35.

Bracket 35 may support an element 36 having a pocket 37 formed in its one face, which pocket is surrounded by a sealing ring 38. The construction of pocket 37 is such that it has a greater horizontal length at its upper end and a much less horizontal length at its lower end. In the present embodiment of the invention it is shown as an inverted triangle, the base being near the upper end of element 36 and the apex near the bottom thereof.

A cooperating element 39 having a pocket 40 and sealing ring 41 may be connected to element 36 by screws 42 with a plate crystal 43 clamped therebetween in the same way that crystal 21 is clamped between element 18 and bracket 14. Both crystals 21 and 43 may be identical.

Referring to FIG. 3, a beam of radiant energy 27 is directed onto a reflector 44 from which it passes to another reflector 45, thence onto the edge 25 of crystal 21, entering the crystal and reflecting back and forth between surfaces 23 and 24 as previously described, thence passing out through edge surface 26 onto a reflector 46, thence to a reflector 47 and into a spectrophotometer 48. A beam 27' from the same or another source is directed onto a reflector 49 from which it passes to a reflector 50, thence onto an edge of crystal 43 in the same way that beam 27 acts on edge 25, through crystal 43 similar to the way beam 27 passes through crystal 21, thence onto a reflector 51, to a reflector 52, and into the spectrophotometer 48 where the resultant beams are compared as is well known.

With a two-component sample within the pockets 16 and 19 in contact with the surfaces 23 and 24 of crystal 21, the effective area of contact of each component will be proportional to the concentration of the component. The variable area cell including pockets 37 and 40 may contain one of the components in contact with the opposite faces of crystal 43 over the triangular area defined by the perimeters of pockets 37 and 40. If the width of the beams 27, 27' is the same, and such as to provide a band that extends over the vertical dimension of the pockets 16, 19, it is evident that beam 27' will provide a band that extends over a vertical dimension that is much less than the vertical dimension of the triangularly shaped pockets 37, 40. In other words, the beam 27 will affect the entire area of the crystal 21 in contact with the sample; whereas the beam 27' will affect only a small portion of the area of the crystal 43 in contact with the one component. Accordingly, by raising and lowering the elements 36, 39, the beam 27' will act on varying areas of the component in pockets 37, 40 in contact with the opposed faces of the crystal 43.

From the foregoing it is evident that by such vertical movement of 36, 39, the effective contact area of the component in the reference cell 37, 40 can be made the same as the effective area of contact of that component in the sample cell 16, 19, thus nulling the spectrum of this component in the spectrophotometer 48 so that the spectrum of the remaining component will be recorded.

This system can be employed with both liquids and solids, as well as a liquid in one beam and a solid in the other. An example of the latter would be dried paint in the reference cell 37, 40, and liquid paint in the sample cell 16, 19. The spectrum would be that of the volatile materials only, if the areas of contact of the solids are properly matched. Or, as previously stated, a solid material may be employed without the need for pocket means 16, 19 or 37, 40.

Although the various features of the improved system of spectroscopy have been shown and described in detail to fully disclose one embodiment of the invention, it will be evident that changes may be made in such details and certain features may be used without others without departing from the principles of the invention.

What is claimed is:

1. Apparatus for obtaining differential absorption spectra by "frustrated multiple internal reflection" comprising means for maintaining a sample in contact with surface means of a plate crystal constructed in a manner to produce multiple internal reflection; a radiant energy beam directed onto an edge of said crystal; reference cell means for maintaining a component of said sample in contact with surface means of another plate crystal simliar to the first mentioned crystal; an identical radiant energy beam directed onto an edge of said other crystal, the dimensions of said reference cell means in the direction of the beam of radiant energy directed onto said other crystal being of widely different values between upper and lower limits of said cell; and means for vertically moving said reference cell to vary the area of contact between the crystal of said reference cell and the component within said reference cell that is affected by said beam of radiant energy, spectrophotometric means for receiving and comparing the outputs of said reference cell and said crystal, whereby the spectrum of said component within said sample is nullified, and the spectrum of another component of said sample can be determined.

2. Apparatus for obtaining differential absorption spectra by "frustrated multiple internal reflection" comprising a stationary sample cell including pocket means for maintaining a sample in contact with surface means of a plate crystal constructed in a manner to produce multiple internal reflection; a radiant energy beam directed onto an edge of said crystal; a reference cell including pocket means for maintaining a component of said sample in contact with surface means of another plate crystal similar to the first mentioned crystal; an identical radiant energy beam directed onto an edge of said other crystal, the dimensions of the pocket means of said reference cell in the direction of the beam of radiant energy directed onto it being of widely different values between upper and lower limits of said cell; and means for vertically moving said reference cell to vary the area of contact between the crystal of said reference cell and the component within said reference cell that is affected by said beam of radiant energy, spectrophotometric means for receiving and comparing the outputs of said reference cell and said crystal, whereby the spectrum of said component within said sample cell is nullified, and the spectrum of another component of said sample can be determined.

3. Apparatus for obtaining differential absorption spectra by "frustrated multiple internal reflection" comprising a stationary sample cell including means for maintaining a sample in contact with surface means of a plate crystal constructed in a manner to produce multiple internal reflection; a radiant energy beam directed onto an edge of said crystal; a reference cell for maintaining a component of said sample in contact with surface means of another plate crystal similar to the first mentioned crystal, said reference cell being triangular in outline; an identical radiant energy beam directed onto an edge of said other crystal; and means for vertically moving said reference cell to vary the area of contact between the crystal of said reference cell and the component within said reference cell that is affected by said beam of radiant energy, spectrophotometric means for receiving and comparing the outputs of said reference cell and said crystal, whereby the spectrum of said component within said sample cell is nullified, and the spectrum of another component of said sample can be determined.

4. Apparatus for obtaining differential absorption spectra by "frustrated multiple internal reflection" comprising a stationary sample cell including pocket means for maintaining a sample in contact with surface means of a plate crystal constructed in a manner to produce multiple internal reflection; a radiant energy beam directed onto an edge of said crystal; a reference cell including pocket means for maintaining a component of said sample in contact with surface means of another plate crystal similar to the first mentioned crystal, the pocket means of said reference cell being triangular in outline; an identical radiant energy beam directed onto an edge of said other crystal; and means for vertically moving said reference cell to vary the area of contact between the crystal of said reference cell and the component within said reference cell that is affected by said beam of radiant energy, spectrophotometric means for receiving and comparing the outputs of said reference cell and said crystal, whereby the spectrum of said component within said sample cell is nullified, and the spectrum of another component of said sample can be determined.

5. Apparatus for obtaining differential absorption spectra by "frustrated multiple internal reflection" comprising a stationary sample cell for maintaining a sample in contact with surface means of a plate crystal constructed in a manner to produce multiple internal reflection, said sample cell being of rectangular outline with its smallest dimension arranged vertically; a radiant energy beam directed onto an edge of said crystal; a reference cell for maintaining a component of said sample in contact with surface means of another plate crystal similar to the first mentioned crystal, said reference cell being triangular in outline with its altitude arranged vertically and being substantially greater than the vertical dimension of said sample cell; an identical radiant energy beam directed onto an edge of said other crystal; and means for vertically moving said reference cell to vary the area of contact between the crystal of said reference cell and the component within said reference cell that is affected by said beam of radiant energy, spectrophotometric means for receiving and comparing the outputs of said reference cell and said crystal, whereby the spectrum of said component within said sample cell is nullified, and the spectrum of another component of said sample can be determined.

6. Apparatus for obtaining differential absorption spectra by "frustrated multiple internal reflection" comprising a stationary sample cell including pocket means for maintaining a sample in contact with surface means of a plate crystal constructed in a manner to produce multiple internal reflection, said pocket means being of rectangular outline with its smallest dimension arranged vertically; a radiant energy beam directed onto an edge of said crystal; a reference cell including pocket means for maintaining a component of said sample in contact with surface means of another plate crystal similar to the first mentioned crystal, the pocket means of said reference cell being triangular in outline with its altitude arranged vertically and being substantially greater than the vertical dimension of said sample cell; an identical radiant energy beam directed onto an edge of said other crystal; and means for vertically moving said reference cell to vary the area of contact between the crystal of said reference cell and the component within said reference cell that is affected by said beam of radiant energy, spectrophotometric means for receiving and comparing the outputs of said reference cell and said crystal, whereby the spectrum of said component within said sample cell is nullified, and the spectrum of another component of said sample can be determined.

No references cited.

JEWELL H. PEDERSEN, *Primary Examiner.*

B. LACOMIS, *Assistant Examiner.*